(12) United States Patent
Amanullah et al.

(10) Patent No.: US 11,268,011 B2
(45) Date of Patent: Mar. 8, 2022

(54) COMPOSITION AND METHOD OF MANUFACTURING OF WHOLE DATE PALM SEED LOST CIRCULATION MATERIAL (LCM)

(71) Applicant: Saudi Arabian Oil Company, Dhahran (SA)

(72) Inventors: Md Amanullah, Dhahran (SA); Turki Alsubaie, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/113,547

(22) Filed: Dec. 7, 2020

(65) Prior Publication Data

US 2021/0139765 A1 May 13, 2021

Related U.S. Application Data

(62) Division of application No. 16/682,966, filed on Nov. 13, 2019, now Pat. No. 10,889,747.

(51) Int. Cl.
C09K 8/514 (2006.01)
C09K 8/502 (2006.01)
(Continued)

(52) U.S. Cl.
CPC .............. *C09K 8/514* (2013.01); *C09K 8/035* (2013.01); *C09K 8/502* (2013.01); *E21B 21/003* (2013.01);
(Continued)

(58) Field of Classification Search
CPC ........ C09K 8/514; C09K 8/035; C09K 8/502; E21B 21/003; E21B 21/062
See application file for complete search history.

(56) References Cited

U.S. PATENT DOCUMENTS 3,042,607 A   7/1962  Morris
3,217,801 A   11/1965 Fast et al.
(Continued)

FOREIGN PATENT DOCUMENTS

WO   2016172287 A1   10/2016
WO   2017087434 A1   5/2017
(Continued)

OTHER PUBLICATIONS

Wajheeuddin, Mohammed (2014). Development of an Environmentally-Friendly Drilling Fluid Using Date Seeds and Grass (Master's thesis). King Fahd University of Petroleum & Minerals, Dhahran, Saudi Arabia. 138 p. Retrieved from <https://eprints.kfupm.edu.sa/id/eprint/139463/1/Thesis_Final_201102890.pdf>. (Year: 2014).*
(Continued)

*Primary Examiner* — Crystal J. Lee
(74) *Attorney, Agent, or Firm* — Bracewell LLP; Constance G. Rhebergen; Brian H. Tompkins

(57) ABSTRACT

A lost circulation material (LCM) that includes whole date palm seeds. The whole date palm seeds LCM includes date palm seeds having lengths greater than 22.6 millimeters (mm), date palm seeds having lengths in the range of 16 mm to 22.6 mm, and date palm seeds having lengths in the range of 1 mm to less than 16 mm. Method of manufacturing the whole date palm seeds LCM include washing and drying whole date palm seeds, such that the drying includes air-drying, hot rolling, and cooling. Methods of reducing lost circulation are also provided.

12 Claims, 3 Drawing Sheets

(51) Int. Cl.
*C09K 8/035* (2006.01)
*E21B 21/00* (2006.01)
*E21B 21/06* (2006.01)

(52) U.S. Cl.
CPC ........ *E21B 21/062* (2013.01); *C09K 2208/04* (2013.01)

(56) References Cited

U.S. PATENT DOCUMENTS

| | | | |
|---|---|---|---|
| 4,247,403 | A | 1/1981 | Foley et al. |
| 4,474,665 | A | 10/1984 | Green |
| 4,579,668 | A | 4/1986 | Messenger |
| 7,541,317 | B2 | 6/2009 | Pomerleau |
| 7,795,184 | B2 | 9/2010 | Pomerleau |
| 9,416,306 | B2 | 8/2016 | Savari et al. |
| 9,957,433 | B2 | 5/2018 | Amanullah et al. |
| 10,240,411 | B1 | 3/2019 | Amanullah |
| 10,259,982 | B2 | 4/2019 | Amanullah |
| 10,266,742 | B1 | 4/2019 | Amanullah et al. |
| 10,323,170 | B1 | 6/2019 | Amanullah et al. |
| 10,329,470 | B1 | 6/2019 | Amanullah et al. |
| 2007/0021307 | A1* | 1/2007 | Pomerleau ............. C09K 8/035 507/204 |
| 2009/0305911 | A1 | 12/2009 | Pomerleau |
| 2014/0038857 | A1 | 2/2014 | Miller et al. |
| 2014/0238674 | A1 | 8/2014 | Savari et al. |
| 2017/0137688 | A1 | 5/2017 | Amanullah |
| 2019/0177593 | A1 | 6/2019 | Amanullah |
| 2019/0177594 | A1 | 6/2019 | Amanullah |
| 2019/0177595 | A1 | 6/2019 | Amanullah |

FOREIGN PATENT DOCUMENTS

| | | |
|---|---|---|
| WO | 2018013619 A1 | 1/2018 |
| WO | 2019156959 A1 | 8/2019 |
| WO | 2019183015 A1 | 9/2019 |

OTHER PUBLICATIONS

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

International Search Report & Written Opinion for International Application No. PCT/US2020/060051 (SA51201), report dated Mar. 12, 2021; pp. 1-14.

* cited by examiner

COMPOSITION AND METHOD OF MANUFACTURING OF WHOLE DATE PALM SEED LOST CIRCULATION MATERIAL (LCM)

CROSS-REFERENCE TO RELATED APPLICATIONS

This application is a divisional of and claims priority from U.S. Non-provisional application Ser. No. 16/682,966 filed Nov. 12, 2019, and titled "COMPOSITION AND METHOD OF MANUFACTURING OF WHOLE DATE PALM SEED LOST CIRCULATION MATERIAL (LCM)," a copy of which is incorporated by reference in its entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation materials (LCMs) for total and severe loss zones.

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

Total and severe loss zones may contain gaps, fractures, and vugs having sizes in the range of 5 millimeters (mm) to 50 mm. A severe loss zone may refer to loss zones exhibiting fluid losses of 100 barrels/hour (bbl/hr) or greater. A total loss zone may refer to a loss zone exhibiting no fluid return. Existing particulate or chip LCMs may be unable to create bridges and flow barriers in the openings in these total and severe loss zones and may limit the effectiveness of LCM treatment jobs.

Typical materials used to prevent lost circulation in total and severe loss zones may include calcium carbonate chips greater than 5 mm in size. However, calcium carbonate chips settle and sag in the drilling fluid circulation system and are difficult to suspend in a drilling fluid or carrier fluid during circulation and placement of a slurry into a loss zone. Another commonly used material, graphite chips, may also suffer from settlement and sagging problems in the drilling fluid circulation system.

In one embodiment, a method to reduce lost circulation of a drilling fluid in a wellbore in a formation is provided. The method includes introducing an altered drilling fluid into the wellbore while drilling such that a loss circulation material (LCM) contacts a lost circulation zone, such that the altered drilling fluid includes the drilling fluid and the LCM. The LCM consists of a first plurality of whole date palm seeds, each of the first plurality of whole date palm seeds having a length greater than 22.6 millimeters (mm), a second plurality of whole date palm seeds, each of the second plurality of whole date palm seeds having a length in the range of 16 mm to 22.6 mm, and a third plurality of whole date palm seeds, each of the third plurality of whole date palm seeds having a length in the range of 1 mm to less than 16 mm.

In some embodiments, the first plurality of whole date palm seeds is in the range of 40 weight (wt) % to 45 wt % of the LCM, the second plurality of whole date palm seeds is in the range of 30 wt % to 35 wt % of the LCM, and third plurality of whole date palm seeds is in the range of 20 wt % to 25 wt %. In some embodiments, the altered drilling fluid consists of the drilling fluid and the LCM. In some embodiments, the drilling fluid is a water-based drilling mud or an oil-based drilling mud. In some embodiments, the first plurality of whole date palm seeds are untreated whole date palm seeds, the second plurality of whole date palm seeds are untreated whole date palm seeds, and the third plurality of whole date palm seeds are untreated whole date palm seeds. In some embodiments, the lost circulation zone is a total loss zone. In some embodiments, the first plurality of whole date palm seeds, the second plurality of whole date palm seeds, and third plurality of whole date palm seeds are produced by: washing whole date palm seeds, drying the whole date palm seeds after the washing, the drying including air-drying the whole date palm seeds for a first time period of at least two hours, hot rolling the whole date palm seeds at a temperature of at least 80° C. for a second time period of at least two hours, and cooling the hot-rolled whole date palm seeds for a third time period of at least two hours. The whole date palm seeds are further produced by sorting the dried whole date palm seeds into the first plurality of whole date palm seeds, the second plurality of whole date palm seeds, and the third plurality of whole date palm seeds. In some embodiments, the LCM has a specific gravity of 1.1.

In another embodiment, an altered drilling fluid is provided. The altered drilling fluid includes a drilling fluid and a lost circulation material (LCM). The LCM consists of a first plurality of whole date palm seeds, each of the first plurality of whole date palm seeds having a length greater than 22.6 millimeters (mm), a second plurality of whole date palm seeds, each of the second plurality of whole date palm seeds having a length in the range of 16 mm to 22.6 mm, and a third plurality of whole date palm seeds, each of the third plurality of whole date palm seeds having a length in the range of 1 mm to less than 16 mm.

In some embodiments, the first plurality of whole date palm seeds is in the range of 40 weight (wt) % to 45 wt % of the LCM, the second plurality of whole date palm seeds is in the range of 30 wt % to 35 wt % of the LCM, and third plurality of whole date palm seeds is in the range of 20 wt % to 25 wt %. In some embodiments, the altered drilling fluid consists of the drilling fluid and the LCM. In some embodiments, the drilling fluid is a water-based drilling mud or an oil-based drilling mud. In some embodiments, the first plurality of whole date palm seeds are untreated whole date palm seeds, the second plurality of whole date palm seeds are untreated whole date palm seeds, and the third plurality of whole date palm seeds are untreated whole date palm seeds. In some embodiments, the first plurality of whole date palm seeds, the second plurality of whole date palm seeds, and third plurality of whole date palm seeds are produced by: washing whole date palm seeds, drying the whole date palm seeds after the washing, the drying including air-drying the whole date palm seeds for a first time period of at least two hours and hot rolling the whole date palm seeds at a temperature of at least 80° C. for a second time period of at least two hours, and cooling the hot-rolled whole date palm seeds for a third time period of at least two hours. The whole date palm seeds are further produced by sorting the dried whole date palm seeds into the first plurality of whole date palm seeds, the second plurality of whole date palm seeds, and the third plurality of whole date palm seeds. In some embodiments, the LCM has a specific gravity of 1.1.

In another embodiment, a lost circulation material (LCM) composition is provided. The LCM composition consists of a first plurality of whole date palm seeds, each of the first plurality of whole date palm seeds having a length greater than 22.6 millimeters (mm), a second plurality of whole date palm seeds, each of the second plurality of whole date palm seeds having a length in the range of 16 mm to 22.6 mm, and a third plurality of whole date palm seeds, each of the third plurality of whole date palm seeds having a length in the range of 1 mm to less than 16 mm, such that the first plurality of whole date palm seeds is in the range of 40 weight (wt) % to 45 wt % of the LCM, the second plurality of whole date palm seeds is in the range of 30 wt % to 35 wt % of the LCM, and third plurality of whole date palm seeds is in the range of 20 wt % to 25 wt %. In some embodiments, the first plurality of whole date palm seeds are untreated whole date palm seeds, the second plurality of whole date palm seeds are untreated whole date palm seeds, and the third plurality of whole date palm seeds are untreated whole date palm seeds.

In another embodiment, a method of manufacturing a lost circulation material (LCM) is provided. The method includes obtaining whole date palm seeds, washing whole date palm seeds, and drying the whole date palm seeds after the washing. The drying includes air-drying the whole date palm seeds at ambient conditions for a first time period of at least two hours and hot rolling the whole date palm seeds at a temperature of at least 80° C. for a second time period of at least two hours, and cooling the hot-rolled whole date palm seeds at ambient conditions for a third time period of at least two hours. The method further includes sorting the dried whole date palm seeds into a first plurality of whole date palm seeds each having a length greater than 22.6 millimeters (mm), a second plurality of whole date palm seeds each having a length in the range of 16 mm to 22.6 mm; and a third plurality of whole date palm seeds each having a length in the range of 1 mm to less than 16 mm. The method also includes mixing a first amount of the first plurality of whole date palm seeds, a second amount of the second plurality of whole date palm seeds, and a third amount of the third plurality of whole date palm seeds into a mixture.

In some embodiments, the first amount is in the range of 40 weight (wt) % to 45 wt of the LCM, the second amount is in the range of 30 wt % to 35 wt % of the LCM, and the third amount is in the range of 20 wt % to 25 wt %. In some embodiments, washing the whole date palm seeds includes washing the whole date palm seeds using pressurized water with mechanical agitation. In some embodiments, sorting the dried whole date palm seeds includes using one or more sieves.

DETAILED DESCRIPTION

Figure 1:
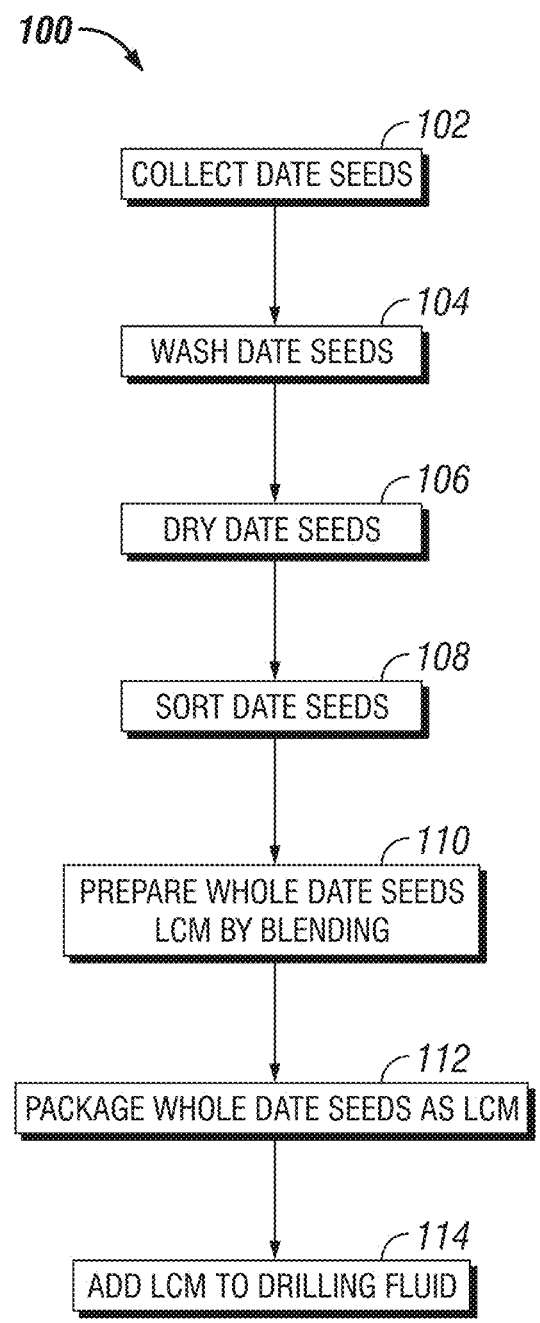
FIG. 1 is a process for the manufacture and use of a whole date palm seed LCM in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a whole date palm seed lost circulation material (LCM) having a mixture of differently sized whole date palm seeds. As used in the disclosure, the term date palm seeds (also referred to as "date seeds" or "date tree seeds") refers to the seeds produced from date trees (also referred to as "date palms"), such as used in the production of date fruits (also referred to as "dates"). The whole date palm seed LCM includes "large" whole date palm seeds (date palm seeds having a length greater than 22.6 mm), "medium" whole date palm seeds (date palm seeds having a length in the range of 16 mm to 22.6 mm) and "small" whole date palm seeds (date palm seeds having a length in the range of 1 mm to less than 16 mm), as determined by sieve sizing of whole date palm seeds.

In some embodiments, the whole date palm seed LCM includes an amount of large date palm seeds in the range 40 weight (wt) % to 45 wt %, an amount of medium date palm seeds in the range of 30 wt % to 35 wt %, and an amount of small whole date palm seeds in the range of 20 wt % to 25 wt %.

The large date palm seeds may include date palm seeds retained in a 22.6 mm mesh sized sieve. The medium date palm seeds may include date palm seeds passed through a 22.6 mm mesh sized sieve and retained by a 16 mm mesh size sieve. The small date palm seeds may include date palm seeds passed through a 16 mm mesh size sieve. Each size of date palm seeds may include variations in morphology. The small date palm seeds may be more short and slender as compared to the medium date palm seeds, while the medium date palm seeds may be thicker and shorter as compared to the large date palm seeds. The large date palm seeds may be longer and thinner as compared to the medium date palm seeds.

In some embodiments, the whole date palm seed LCM may have a log on grinding index (LOG I) of about 0. The specific gravity of the whole date palm seed LCM may be about 1.1. The density of the whole date palm seed LCM may be about 1.1 grams per cubic centimeter (g/cm$^3$) The density of the whole date palm seed LCM may ensure minimal to no settlement of the LCM in a fluid tank and fluid circulation system (for example, a drilling fluid circulation system), minimal to no sagging in a deviated hole sections, and minimal to no bedding in horizontal wellbores. When introduced into a loss zone, the whole date palm seed LCM may form plugs, seals, bridges, flow barriers, or other structures in gaps, fractures, vugs, and other openings in the loss zone that have sizes greater than 5 mm. For example, the whole date palm seed LCM may form plugs, bridges, flow barriers, or other structures in openings having sizes in the range of 5 mm to 50 mm.

The date palm seeds may be obtained from pruning waste and date processing plants to provide a sustainable source of material for the whole date palm seed LCM. The date palm seeds are obtained from the species *phoenix dactylifera*. It should be appreciated that, in some embodiments, the date palm seeds may be obtained from genetically modified date trees (that is, genetically modified organisms (GMOs)).

In some embodiments, the date palm seeds may include untreated date palm seeds to preserve the environmentally-friendly and biodegradable properties of the manufacturing process, the date palm seeds, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass heating to remove moisture but includes chemical treatments. In such embodiments, the whole date palm seeds may be manufactured without treating before, during, or after washing, drying, or any other processing.

The whole date palm seed LCM may be added to a carrier fluid or a drilling fluid that is circulated (for example, via a pump) to position the LCM into contact with a lost circulation zone in a wellbore. In some embodiments, the whole date palm seed LCM may be added directly to a drilling fluid, such as a drilling mud, to create an altered drilling fluid having the whole date palm seed LCM. For example, in some embodiments, the whole date palm seed LCM may be added to (for example, blended with) an oil-based drilling mud or a water-based drilling mud. In some embodiments, the whole date palm seed LCM may be added at the mud pit of a mud system. After addition of the whole date palm seed LCM to a drilling fluid, the altered drilling fluid may be circulated at a pump rate effective to position the altered drilling fluid into contact with a lost circulation zone in a wellbore, such that the whole date palm seed LCM alters the lost circulation zone (for example, by forming structures in gaps, fractures, vugs, and other openings in a formation).

In some embodiments, the whole date palm seed LCM may have a concentration in the range of about 10 pounds-per-barrel (ppb) to about 50 ppb in a drilling fluid. In some embodiments, the whole date palm seed LCM may have a concentration in the range of about 15 ppb to about 30 ppb in a drilling fluid. In some embodiments, the drilling fluid or carrier fluid may be water-based mud, such as a bentonite mud, a potassium chloride (KCl)-polymer mud, a low solids non-dispersed (LSND) mud, a calcium chloride ($CaCl_2$)-polymer mud, a sodium chloride (NaCl)-polymer mud, or other water-based muds. An example bentonite mud may include water, bentonite, caustic soda, and soda ash. An example KCl-polymer mud may include water, caustic soda, soda ash, bentonite, KCl, XC polymer, and a filtrate control additive. In some embodiments, the drilling fluid or carrier fluid may an oil-based mud, such as diesel-, mineral-, or synthetic-oil based muds.

FIG. 1 depicts a process 100 for the production and use of a whole date palm seed LCM in accordance with an example embodiment of the disclosure. As shown in FIG. 1, whole date palm seeds may be collected (block 102). In some instances, the whole date palm seeds are collected from date tree waste produced by date tree farming and date processing industries. The date palm seeds may be washed to remove fruit particles and other debris and foreign substances (block 104), such as by pressurized water or an air jet in a closed loop system with mechanical agitation. The washed whole date palm seeds may be then be dried using one or more techniques (block 106). In some embodiments, the whole date palm seeds may be dried using a hot rolling to improve the ductility of the date palm seeds. In such embodiments, the washed whole date palm seeds are first air-dried at ambient temperature for a time period of at least two hour, then hot rolled (for example, in a roller oven) at a temperature of at least 80° C. for a time period of at least two hours, then cooled at ambient conditions (temperature and pressure) for a time period of at least two hours.

The dried whole date palm seeds may be sorted by seed length into different sizes using sieves of the appropriate mesh sizes (block 108). For example, the dried whole date palm seeds may be sorted into large whole date palm seeds having a length greater than 22.6 mm by using a sieve of ⅞ inches (22.6 mm) mesh size, medium whole date palm seeds having a length in the range of 16 mm to 22.6 mm using a sieve of ⅞ inches (22.6 mm) mesh size and a sieve of ⅝ inches (16 mm) mesh size, and small whole date palm seeds having a length greater than 1 mm and less than 16 mm using a sieve of ⅝ inches (16 mm) mesh size.

Whole date palm seeds of different sizes may be blended in the appropriate amounts to produce the whole date palm seed LCM (block 110). In some embodiments, the whole date palm seed LCM includes an amount of large date palm seeds in the range of large date palm seeds in the range of 40 weight (wt) % to 45 wt %, an amount of medium date palm seeds in the range of 30 wt % to 35 wt %, and an amount of small whole date palm seeds in the range of 20 wt % to 25 wt %. The blended whole date palm seeds may be blended packed for transportation and use (block 112). A suitable amount of the blended whole date palm seeds may then be transported to an oil and gas operations site for use as an LCM.

The whole date palm seed LCM may be added directly to a drilling fluid (block 114), such as a drilling mud, to create an altered drilling fluid having the whole date palm seed LCM. For example, in some embodiments, the whole date palm seed LCM may be added to (for example, blended with) an oil-based drilling mud or a water-based drilling mud. In some embodiments, the whole date palm seed LCM may be added at the mud pit of a mud system.

After addition of the whole date palm seed LCM to a drilling fluid, the altered drilling fluid may be circulated at a pump rate effective to position the drilling fluid into contact with a lost circulation zone in a wellbore, such that the whole date palm seed LCM alters the lost circulation zone (for example, by entering and blocking in a formation in the lost circulation zone). In some embodiments, the lost circulation zone may be a severe loss zone or a total loss zone, including loss zones having gaps, fractures, and vugs and other openings in the range of 5 millimeters (mm) to 50 mm in size. The whole date palm seed LCM may form structures (for example, plugs or seals) at gaps, fractures, vugs, and other openings in a loss zone. In some embodiments, the reduced rate of lost circulation may be negligible.

In some embodiments, the whole date palm seed LCM may be introduced via an open ended drill pipe to place the LCM in the lost circulation zone. In some embodiments, the whole date palm seed LCM may be introduced using a bypass system (that is, a system that enables bypassing the bottom hole assembly (BHA)) to introduce the LCM into the wellbore.

In other embodiments, the whole date palm seed LCM and one or more additional LCMs may be added to a drilling fluid, such as a drilling mud, to create an altered drilling fluid having the LCMs. For example, in some embodiments, the whole date palm seed LCM and one or more additional LCMs may be added to an oil-based drilling mud or a water-based drilling mud. In some embodiments, the whole date palm seed LCM may be used to form bridges in paths, cracks, and fractures in a formation in the lost circulation zone. In such embodiments, an additional LCM may be introduced into the lost circulation zone, such as via an altered drilling fluid having the additional LCM. The additional LCM may accumulate on the bridges formed by the whole date palm seed LCM to seal or plug the lost circulation zone.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a date palm seed-based LCM was prepared and evaluated against a commercially available LCM. The example whole date palm seed LCM included the following: large date palm seeds in the range of 40 weight (wt) % to 45 wt %; medium date palm seeds in the range of 30 wt % to 35 wt %; and small whole date palm seeds in the range of 20 wt % to 25 wt %.

The degradation potential of the example whole date palm seed LCM was evaluated by measuring the loss on grinding index (LOG I). The loss on grinding index was measured by determining the ratio of material lost after two hours of wet grinding to the original mass of the material. The wet grinding was performed to simulate the attrition effect of surface and subsurface tools and the hydrodynamic forces of circulating fluid that would impact an LCM. The wet grinding test used a test cell to simulate a piece of a wellbore, a free rotating metal cylinder to simulate the attrition effect of surface and subsurface tools and equipment, and water as the carrier fluid to simulate hydrodynamic forces. The wet grinding test used rotating equipment to the rotate the test cell at a rotational speed of about 35 revolutions per minute (rpm) to simulate aggressive hydrodynamic forces.

The example whole date palm seed LCM was compared against three commercially available calcium carbonate chips. The LOG I of the each of the three calcium carbonate chips was measured using the same testing conditions. 25 grams (g) of the example whole date palm seed LCM or the calcium carbonate ($CaCO_3$) chips were placed in the test cell and rotated at the rotational speed for a time period of about two hours at room temperature. The mass of the material lost was measured and used to determine the LOG I from the original 25 g.

Figure 2:
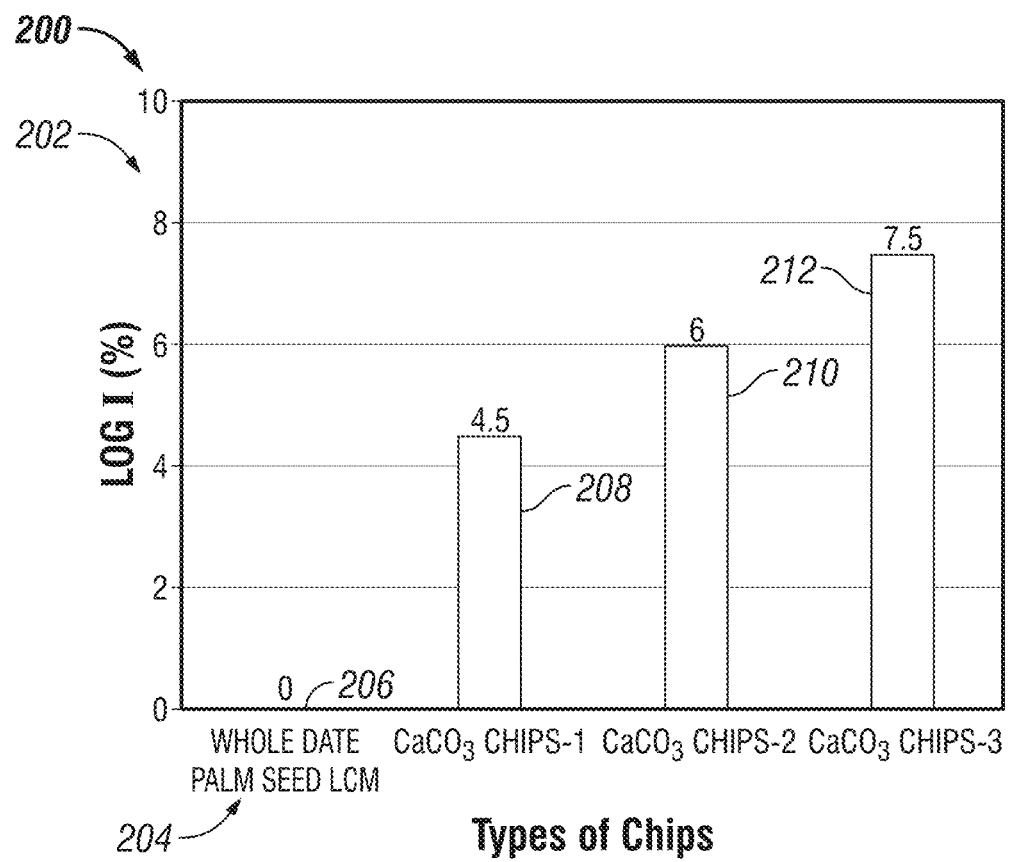
FIG. 2 is a bar graph depicting the measured log on grinding index (LOG I) for an example whole date palm seed LCM and the three commercially available calcium carbonate chips in accordance with an embodiment of the disclosure.

FIG. 2 is a bar graph 200 depicting the measured LOG I for the example whole date palm seed LCM and each of the three commercially available calcium carbonate chips. The y-axis 202 depicts the LOG I (in percentage (%)), and the x-axis 204 depicts each tested material. As shown in FIG. 2, the example whole date palm seed LCM (illustrated by bar 206) had a LOG I of 0. As also shown in FIG. 2, the first commercially available calcium carbonate chips (illustrated by bar 208) had a LOG I of 4.5, the second commercially available calcium carbonate chips (illustrated by bar 210) had a LOG I of 6, and the third commercially available calcium carbonate chips (illustrated by bar 212) had a LOG I of 7.5. Thus, the whole date palm seed LCM experienced approximately no loss of materials, while the commercially available calcium carbonate chips showed a 4.5 to 7.5% loss of materials depending on the source of the chips. The results of the degradation testing show that the whole date palm seed LCM did not exhibit any loss of materials when subject to simulated mechanical and hydrodynamic forces encountered in a wellbore during operations and fluid circulation. As shown by these results, a whole date palm seed LCM may be expected to maintain physical integrity during pumping, transportation, and placement into a loss zone, thus improving the likelihood of success of an LCM treatment operation. In contrast to the calcium carbonate chips, the whole date palm seeds had a smooth surface and oblong morphology; the calcium carbonate chips had a sub-angular morphology which may contribute to the material loss.

The suspension capacity of the example whole date palm seed LCM was evaluated using a vicious fluid having viscous characteristics similar to a carrier fluid typically used in oil and gas well drilling. The viscous fluid was prepared by mixing 2.5 g of XC polymer (xanthan gum) in 350 cubic centimeters (cc) of water and mixing using a commercially available mixer. The example whole date palm seed LCM was compared against one of the commercially available calcium carbonate chips. The whole date palm seed LCM and calcium carbonate chips were placed in separate containers with the viscous fluid and observed over a time period of about two days.

Figure 3A:
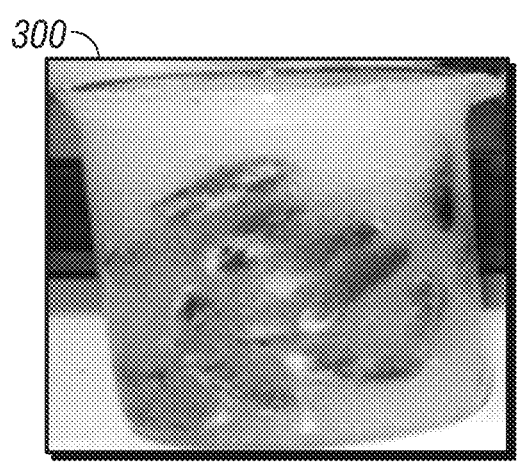
FIGS. 3A and 3B are photographs of an example whole date palm seed LCM and commercially available calcium carbonate chips in a viscous fluid after a time period in accordance with an embodiment of the disclosure.
Figure 3B:
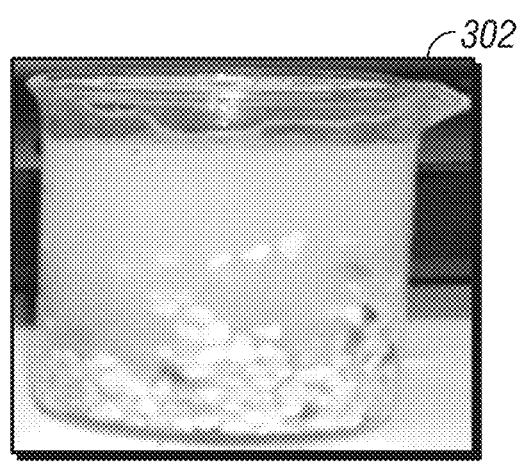

FIG. 3A is a photograph 300 of the example whole date palm seed LCM in the viscous fluid after the two day time period, and FIG. 3B is a photograph 302 of the calcium carbonate chips in the viscous fluid after the time period. The whole date palm seeds were initially suspended in the carrier fluid and, as shown in FIG. 3A, the whole date palm seeds remained suspended in the carrier fluid after the time period. In contrast, as shown in FIG. 3B, the calcium carbonate chips showed poor suspension capability and quickly settled at the bottom of the container of viscous fluid.

As compared to the calcium carbonate chips, the superior suspension potential of the example whole date palm seed LCM may eliminate settlement and sagging of the LCM while circulating to improve placement in a severe or total loss zone. Based on the results of the testing, the whole date palm seed LCM will likely have minimal to no settling or sagging during pumping or placement into a loss zone, thus improving the likelihood of success of an LCM treatment in such zones.

Figure 4:
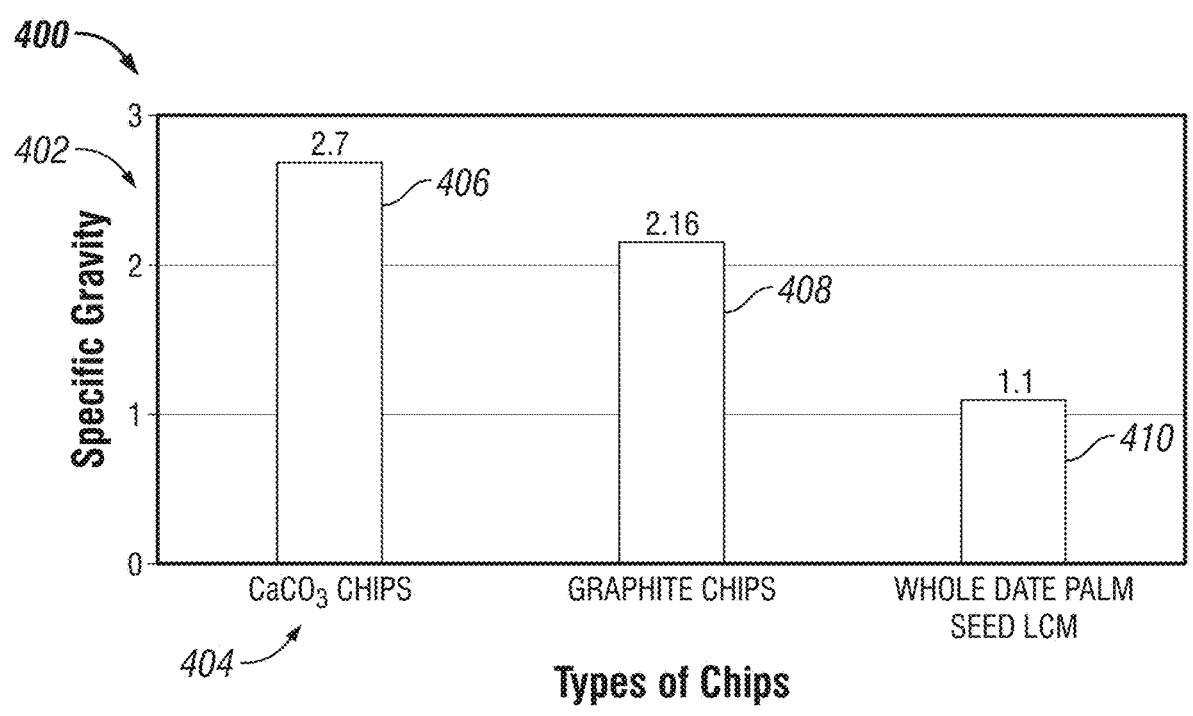
FIG. 4 is a bar graph of the specific gravities of an example whole date palm seed LCM, commercially available calcium carbonate chip, and commercially available graphite chips in accordance with an embodiment of the disclosure.

The specific gravity of the example whole date palm seed LCM was also determined and compared against commercially available calcium carbonate chips and commercially available graphite chips. FIG. 4 is a bar graph 400 of the specific gravities of the example whole date palm seed LCM and the two commercially available calcium carbonate chips. The y-axis 402 corresponds to the specific gravity, and the x-axis 404 corresponds to each material. As shown in FIG. 4, the commercially available calcium carbonate chips (illustrated by bar 406) have a specific gravity of 2.7, and the commercially available graphite chips (illustrated by bar 408) have a specific gravity of 2.16. As also shown in FIG. 4, the example whole date palm seed LCM (illustrated by bar 410) has a specific gravity of 1.1. Thus, the example whole date palm seed LCM has a specific gravity about 2.45 times less than the commercially available calcium carbonate chips and about 1.9 times less than the commercially available graphite chips. The reduced specific gravity of the example whole date palm seed LCM may enable the LCM to remain in suspension in the carrier fluid for a greater time period (as compared to the calcium carbonate and graphite chips) to enable transportation to total and severe loss zones. Here again, the improved suspension may enable the likelihood of a successful LCM treatment in severe and total loss zones.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. An altered drilling fluid, comprising:
    a drilling fluid; and
    a lost circulation material (LCM), wherein the LCM consists of:
        a first plurality of whole date palm seeds, each of the first plurality of whole date palm seeds having a length greater than 22.6 millimeters (mm);
        a second plurality of whole date palm seeds, each of the second plurality of whole date palm seeds having a length in the range of 16 mm to 22.6 mm; and
        a third plurality of whole date palm seeds, each of the third plurality of whole date palm seeds having a length in the range of 1 mm to less than 16 mm.

2. The altered drilling fluid of claim 1, wherein the first plurality of whole date palm seeds is in the range of 40 weight (wt) % to 45 wt % of the LCM, the second plurality of whole date palm seeds is in the range of 30 wt % to 35 wt % of the LCM, and the third plurality of whole date palm seeds is in the range of 20 wt % to 25 wt %.

3. The altered drilling fluid of claim 1, wherein the altered drilling fluid consists of the drilling fluid and the LCM.

4. The altered drilling fluid of claim 1, wherein the drilling fluid comprises a water-based drilling mud or an oil-based drilling mud.

5. The altered drilling fluid of claim 1, wherein the first plurality of whole date palm seeds comprises untreated whole date palm seeds, the second plurality of whole date palm seeds comprises untreated whole date palm seeds, and the third plurality of whole date palm seeds comprises untreated whole date palm seeds.

6. The altered drilling fluid of claim 1, wherein the first plurality of whole date palm seeds, the second plurality of whole date palm seeds, and the third plurality of whole date palm seeds are produced by:
    washing whole date palm seeds;
    drying the whole date palm seeds after the washing, the drying comprising:
        air-drying the whole date palm seeds for a first time period of at least two hours;
        hot rolling the whole date palm seeds at a temperature of at least 80° C. for a second time period of at least two hours; and
        cooling the hot-rolled whole date palm seeds for a third time period of at least two hours;
    sorting the dried whole date palm seeds into the first plurality of whole date palm seeds, the second plurality of whole date palm seeds, and the third plurality of whole date palm seeds.

7. A lost circulation material (LCM) composition, consisting of:
    a first plurality of whole date palm seeds, each of the first plurality of whole date palm seeds having a length greater than 22.6 millimeters (mm);
    a second plurality of whole date palm seeds, each of the second plurality of whole date palm seeds having a length in the range of 16 mm to 22.6 mm; and
    a third plurality of whole date palm seeds, each of the third plurality of whole date palm seeds having a length in the range of 1 mm to less than 16 mm;
    wherein the first plurality of whole date seeds is in the range of 40 weight (wt) % to 45 wt % of the LCM, the second plurality of whole date palm seeds is in the range of 30 wt % to 35 wt % of the LCM, and the third plurality of whole date palm seeds is in the range of 20 wt % to 25 wt %.

8. The LCM composition of claim 7, wherein the first plurality of whole date palm seeds comprises untreated whole date palm seeds, the second plurality of whole date palm seeds comprises untreated whole date palm seeds, and the third plurality of whole date palm seeds comprises untreated whole date palm seeds.

9. A method of manufacturing a lost circulation material (LCM), comprising:
    obtaining whole date palm seeds;
    washing the whole date palm seeds;
    drying the whole date palm seeds after the washing, the drying comprising:
        air-drying the whole date palm seeds at ambient conditions for a first time period of at least two hours;

hot rolling the whole date palm seeds at a temperature of at least 80° C. for a second time period of at least two hours; and cooling the hot-rolled whole date palm seeds at ambient conditions for a third time period of at least two hours;

sorting the dried whole date palm seeds into a first plurality of whole date palm seeds each having a length greater than 22.6 millimeters (mm), a second plurality of whole date palm seeds each having a length in the range of 16 mm to 22.6 mm, and a third plurality of whole date palm seeds each having a length in the range of 1 mm to less than 16 mm; and mixing a first amount of the first plurality of whole date palm seeds, a second amount of the second plurality of whole date palm seeds, and a third amount of the third plurality of whole date palm seeds into a mixture.

10. The method of claim 9, wherein the first amount is in the range of 40 weight (wt) % to 45 wt % of the LCM, the second amount is in the range of 30 wt % to 35 wt % of the LCM, and the third amount is in the range of 20 wt % to 25 wt %.

11. The method of claim 9, wherein washing the whole date palm seeds comprises washing the whole date palm seeds using pressurized water with mechanical agitation.

12. The method of claim 9, wherein sorting the dried whole date palm seeds comprises using one or more sieves.

* * * * *